United States Patent
Bowen et al.

(10) Patent No.: US 8,932,737 B2
(45) Date of Patent: *Jan. 13, 2015

(54) DURABLE UV BLOCKING TRANSPARENT COATING

(71) Applicant: The Boeing Company, Chicago, IL (US)

(72) Inventors: David A. Bowen, Bellevue, WA (US); Kjersta L. Larson-Smith, Seattle, WA (US); Vasan S. Sundaram, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,484

(22) Filed: Feb. 12, 2014

(65) Prior Publication Data

US 2014/0162037 A1    Jun. 12, 2014

Related U.S. Application Data

(62) Division of application No. 12/409,422, filed on Mar. 23, 2009, now Pat. No. 8,685,544.

(51) Int. Cl.
| | |
|---|---|
| *B32B 15/04* | (2006.01) |
| *C09D 183/04* | (2006.01) |
| *C09D 1/00* | (2006.01) |
| *C09D 5/32* | (2006.01) |

(Continued)

(52) U.S. Cl.
CPC ............. *C09D 183/04* (2013.01); *C09D 1/00* (2013.01); *C09D 5/32* (2013.01); *C09D 7/1216* (2013.01); *C08G 77/50* (2013.01); *C08K 3/22* (2013.01)

USPC ........... 428/698; 428/688; 428/689; 428/699; 428/701; 428/702; 428/704; 428/428; 428/432; 427/402

(58) Field of Classification Search
USPC ......... 428/688, 689, 698, 699, 701, 702, 704, 428/428, 432; 427/402
See application file for complete search history.

(56) References Cited

U.S. PATENT DOCUMENTS

| | | | |
|---|---|---|---|
| 5,344,712 A | | 9/1994 | Basil et al. |
| 5,618,626 A | * | 4/1997 | Nagashima et al. .......... 428/429 |

(Continued)

FOREIGN PATENT DOCUMENTS

| | | |
|---|---|---|
| FR | 1273247 A | 10/1961 |
| JP | 02-228334 | 9/1990 |

OTHER PUBLICATIONS

Web Elements, "Silicon," downloaded from <http://www.webelements.com/silicon/> on Apr. 30, 2014; pp. 1-3.

*Primary Examiner* — David Sample
*Assistant Examiner* — Lauren Colgan
(74) *Attorney, Agent, or Firm* — Moore & Van Allen PLLC

(57) ABSTRACT

A coating and associated method for coating is disclosed. The coating provides a hard, transparent, UV blocking coating for a substrate. A UV blocking layer is first deposited upon the substrate, and a hard coating is deposited above the UV blocking layer. A soft coating layer may be deposited between the UV blocking layer and the hard coating. The soft and hard coating layers may both have the general composition $SiO_xC_y$. the soft and hard coating layers may be deposited by a plasma vapor deposition process.

14 Claims, 2 Drawing Sheets

(51) Int. Cl.
*C09D 7/12* (2006.01)
*C08G 77/50* (2006.01)
*C08K 3/22* (2006.01)

(56) References Cited

U.S. PATENT DOCUMENTS

| | | | |
|---|---|---|---|
| 5,665,450 A | 9/1997 | Day | |
| 6,077,569 A * | 6/2000 | Knapp et al. | 427/534 |
| 6,889,938 B1 * | 5/2005 | Nordman | 244/129.3 |
| 6,949,598 B2 * | 9/2005 | Terry | 524/398 |
| 7,878,054 B2 * | 2/2011 | Larson et al. | 73/150 R |
| 8,685,544 B2 | 4/2014 | Bowen | |
| 2002/0035032 A1 | 3/2002 | Koper | |
| 2007/0122598 A1 * | 5/2007 | Coak et al. | 428/212 |
| 2007/0196633 A1 * | 8/2007 | Coak et al. | 428/215 |
| 2007/0219298 A1 | 9/2007 | Higuchi | |
| 2008/0241523 A1 * | 10/2008 | Huignard et al. | 428/336 |
| 2009/0311539 A1 * | 12/2009 | Larson-Smith et al. | 428/446 |
| 2010/0239742 A1 * | 9/2010 | Larson-Smith et al. | 427/8 |
| 2010/0239870 A1 | 9/2010 | Bowen | |

* cited by examiner

DURABLE UV BLOCKING TRANSPARENT COATING

CROSS-REFERENCE TO RELATED APPLICATION

This application is a divisional of U.S. patent application Ser. No. 12/409,422, filed Mar. 23, 2009, now U.S. Pat. No. 8,685,544, the contents of which are Incorporated herein by reference in their entirety.

FIELD

This disclosure relates generally to a wear resistant coating, and more particularly, to a durable dual layer transparent coating that includes an ultra violet (UV) blocking layer.

BACKGROUND

Plastics are finding increasing use in manufactured goods. For example, certain automobiles have plastic body panels, and aircraft have plastic interior paneling and exterior skin panels formed of plastics and plastic composites. While plastics offer several excellent properties including light weight, formability, and low cost, plastics also have significant disadvantages. In general, plastic surfaces are not as hard or abrasion resistant as metal surfaces. Furthermore, while some plastics may be transparent, glass, which is much heavier and more expensive, remains the material of choice in certain critical applications such as safety glass in automobiles and in passenger aircraft windshields. Substituting polymeric materials such as stretched acrylic or polycarbonate would lead to lighter transparencies, but would also pave the way for re-designing the overall shape of cockpits, for example. A new class of transparent composites made of glass fiber reinforced polymer have been developed that have mechanical characteristics, such as tensile strength, which are comparable to aluminum. However, these transparent composites are soft and are highly susceptible to UV, chemical attack and or mechanically induced degradation. Currently, stretched acrylic materials are used to fabricate aircraft passenger windows. Acrylic is used because of its flexibility, light weight, and easy formability. However, acrylic is a soft material and hence can be easily scratched. Water absorption, chemical attack, and mechanically induced scratches can lead to crazing when stress is applied to acrylic materials, as in a passenger window application.

Industry wide, polymer based transparencies are protected against wear and other chemical/nature induced degradation through siloxane coatings. At the present time, polycarbonate and other types of polymeric windows are protected by sol-gel based polysiloxane coatings. The term sol-gel or solution-gelation refers to materials undergoing a series of hydrolization and condensation reactions. The sol-gel coatings are homogeneous mixtures of a solvent, an organosilane, an alkoxide and a catalyst that are processed to form a suitable coating. The sol-gel coatings provide high transmittance and limited durability against wear and UV induced degradation. Typically, a metal alkoxide or metal salt is hydrolyzed to form a metal hydroxide. The metal hydroxide then condenses in solution to form a hybrid organic/inorganic polymer. The ratio of organic to inorganic components in the polymer matrix is controlled to maximize the performance for a given application. For example, increasing the organic groups would improve flexibility but may compromise wear and environmentally induced durability. The sol-gel coating may include materials such as cerium or titanium to improve abrasion resistance and ultraviolet induced degradation of the coatings. A typical application process would consist of component surface cleaning, followed by the application of the coating via a flow, spray or dip process. The surface cleaning may be achieved by solvent wiping with, for example, isopropyl alcohol or exposing the component to oxygen plasma. The sol-gel coatings can be cured at room temperature or elevated temperatures. For example, stretched acrylics must be cured at temperatures less than 180° F.

Aircraft cockpit windows are currently made of multi-pane glass for strength and abrasion resistance. Efforts are on going to switch to polymeric material based flight deck windows as these materials are light and are amenable to forming desired shapes at a low cost. While plastics offer several excellent properties such as light weight, formability, and low cost, plastics also have significant short comings. In general, plastic surfaces are not as hard or abrasion resistant as glass or steel surfaces. Polymeric materials are susceptible to particle (e.g. sand)/water induced erosion and chemical crazing; protective hard coatings are needed to maintain the optical quality of the windows in use.

In addition, while a polymeric-glass laminate has weight savings over an all glass laminate, additional weight savings could be achieved by removal of the glass facing ply if erosion and abrasion were not a problem. The polymeric-glass laminate also suffers from thermally induced stresses which degrade service life due to the thermal expansion difference between the glass and polymeric layers. Matching contour between glass and polymeric plies poses manufacturing problems and often leads to optical and service related issues in the final part. Commercially available transparent hard coatings are in general solvent based polysiloxane. These coatings are applied through a dip, spray or float coat process and offer limited durability Duplex coating schemes have been developed that offer improved performance. For example, a dual layer scheme has been developed that includes a relatively soft hard coat, such as polysiloxane with a harder but brittle top layer. Further developments to dual layer schemes include a multilayer scheme as well as a dual layer coating applied using only plasma deposition. While these newer coating developments offer outstanding durability, they transmit light over all wavelengths, including UV.

There is a need for a durable, transparent, hard coating that improves component lifetime by providing UV protection. The coating should provide improved resilience against chemicals commonly encountered in product maintenance, excellent weatherability characteristics, and UV protection. The coating should be both hard and flexible, so that it tolerates the flexing of the polymeric material due to operation and thermal stresses. The coating should be provided by a simple process and at a low cost.

SUMMARY

The following embodiments and aspects thereof are described and illustrated in conjunction with systems and methods that are meant to be exemplary and illustrative, not limiting in scope. In various embodiments, one or more of the problems described above in the Background have been reduced or eliminated, while other embodiments are directed to other improvements.

A first embodiment of the disclosure provides for a coating including a UV blocking layer and a hard coating layer disposed above the UV blocking layer. The hard coating layer has the general formula $SiO_xC_y$.

A second embodiment of the disclosure provides for an article including a substrate and a coating deposited upon the substrate. The coating includes a UV blocking layer disposed upon the substrate and a hard coating layer. The hard coating layer has the general formula $SiO_xC_y$.

A third embodiment of the disclosure provides for a method of forming a coating on a substrate including the steps of providing a substrate, depositing UV blocking layer upon the substrate, and depositing a hard coating layer upon the UV blocking layer. The hard coating has the general formula $SiO_xC_y$.

One advantage of the present disclosure is to provide a transparent, hard coating with excellent durability and UV protection.

Another advantage of the present disclosure is to provide a transparent, hard coating having UV protection that improves component lifetime.

Another advantage of the present disclosure is to provide a transparent, hard coating that is both hard and flexible and provides UV protection.

Another advantage of the present disclosure is to provide a transparent, hard coating that provides improved resistance against chemicals commonly encountered in product maintenance, which further provides UV protection.

Another advantage is to provide a transparent, hard coating providing excellent weatherability characteristics and UV protection.

Another advantage of the present disclosure is to provide a process for applying a transparent, hard coating that provides UV protection.

Another advantage of the present disclosure is to provide a durable coating that provides UV blocking.

Another advantage of the present disclosure is to provide a method of forming a coating on a substrate including the steps of applying coatings having differing characteristics.

Another advantage of the disclosure is to provide a method of applying transparent hard coating having different engineering properties like hardness and elastic modulus.

Another advantage is to provide a transparent, hard coating having UV protection at temperatures compatible with a substrate or without damaging a substrate or degrading its physical properties.

Another advantage is to provide a transparent, hard coating having UV protection that can be substantially seamlessly varied within the coating thickness.

Further aspects of the method and apparatus are disclosed herein. Other features and advantages of the present disclosure will be apparent from the following more detailed description of the preferred embodiment, taken in conjunction with the accompanying drawings that illustrate, by way of example, the principles of the invention.

DETAILED DESCRIPTION

The present disclosure now will be described more fully hereinafter with reference to the accompanying drawing, in which a preferred embodiment of the invention is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art. All composition percents are given as weight percents, unless otherwise specified.

Figure 1:
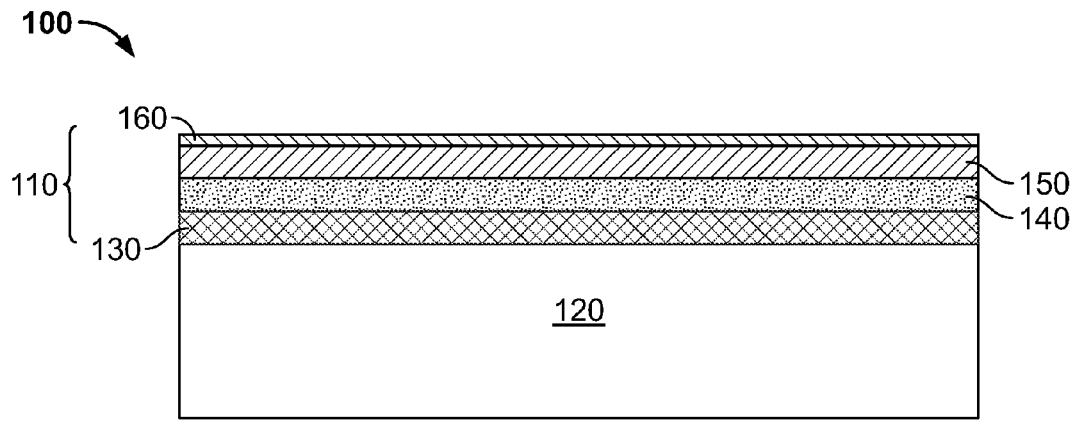
FIG. 1 is an exemplary embodiment of an applied coating according to the disclosure.

FIG. 1 illustrates an embodiment of an exemplary coated article 100 according to the disclosure. The coated article 100 includes a coating 110 and a substrate 120. The coated article 100 may be an aircraft window, aircraft cockpit canopy, or other coated transparent substrate. For example, the coated article 100 may be selected from a group including, but not limited to an acrylic aircraft window, an airplane cockpit, an airplane navigation light lens, and a fiberglass-epoxy radome. Additionally, the coated article 100 need not be limited to the aircraft industry. For example, the coated article 100 may further be selected from a group including, but not limited to consumer electronics such as polycarbonate cases for consumer electronics, cell phone touch screens, and automotive applications such as automobile parts, panels and windows, as well as other industry applications exposed to wear and damage.

As can be seen in FIG. 1, in an exemplary embodiment of the disclosure, a coating 110 is disclosed that includes a first layer 130, a second layer 140, a third layer 150, and an optional fourth layer 160. The first layer 130 is formed of a UV blocking material. The first layer 130 is deposited adjacent or directly upon the substrate 220. The UV blocking material is selected to absorb UV wavelength light. In one embodiment, the UV blocking material may be a polyurethane or polysiloxane based material. In another embodiment, the UV blocking material may be a UV blocking polymer material. For example, the UV blocking polymer material may be a polyurethane or other polymer containing benzophenone to other phenol containing compound that absorbs UV light. In another embodiment, the UV blocking material may be a metal oxide. For example, the UV blocking material may zinc oxide, titanium oxide, cerium oxide, or any mixture of these metal oxides. In yet another embodiment, the UV blocking material may be a polymer material including metal oxide particles. In one example, the UV blocking material may be a polymer containing nano-scale particles of zinc oxide. The alternating multilayer design creates more interfaces which allows for any advancing crack to be deflected, thereby dissipating energy and improving toughness.

In one embodiment, the UV blocking material may be applied by a process including, but not limited to, spray coating, float coating, plasma deposition and sputtering. In one embodiment, the UV blocking layer blocks more than 97% of UV radiation up to 375 nm. In another embodiment, the UV blocking layer blocks for than 98% of UV radiation up to 375 nm. In another embodiment, the UV blocking layer blocks for than 99% of UV radiation up to 375 nm.

The second layer 140 is a first protective layer. The first protective layer 140 may be a soft coating material such as a polysiloxane coating. In one embodiment, the first protective layer 140 is a polysiloxane having a general formula $Si_xO_yC_z$. In one embodiment, the first protective layer 140 may be applied by a process selected from a group including, but not limited to a dip process and a plasma deposition process. The first protective layer 140 has a first hardness and first modulus.

The third layer 150 is a second protective layer. The second protective layer 150 is a hard coating material, for example a $Si_xO_yC_z$. In one embodiment, the second protective layer 150 is deposited by plasma deposition. The second protective layer 150 has a second hardness and a second modulus. The second hardness is selected to be greater than the first hardness of the first protective layer 140. In addition, the second modulus is greater than the first modulus of the first protective layer 140. As defined herein, the term soft layer is defined as having a hardness factor less than that of an adjacent outer hard layer. The hardness factor may be selected from the group including, but not limited to known hardness factors including scratch hardness, indentation hardness.

The optional fourth layer 160 is an outer protective layer. The outer protective layer 160 is a transparent hydrophobic coating. In one embodiment, the outer protective layer 160 may be a fluorinated hydrocarbon. In another embodiment, the outer protective layer 160 is a non-polar organosilane. The outer protective layer 160 may be applied by any suitable method, for example, but not limited to spraying, wiping, painting, and dipping. In one embodiment, the outer protective layer 160 may have a thickness of between about 1 nm and about 5 nm. In another embodiment, the outer protective layer 160 has a thickness of between about 1 nm and about 3 nm. In yet another embodiment, the outer protective coating has a thickness of less than about 1 nm.

In addition to the outer protective layer 160 providing water repellency to the coating 110, the outer protective layer 160 may also provide an additional layer of physical protection for the substrate 120. In one embodiment, the outer protective layer 160 also functions as a wear indicator. The outer protective layer 160 indicates wear when the hydrophobicity of the coating is degraded or partially degraded, that is, when the coating 110 is less hydrophobic. The decrease in hydrophobicity indicates that some or all of the coating 110 has been abraded away, damaged, or otherwise removed, such as for example by chemical attack or physical abrasion, and that some or all of the coating 110 needs to be reapplied.

In an alternative embodiment, the first layer 130 and the second layer 140 are combined in a single layer (not shown) having protective and UV blocking properties. In one embodiment, the single layer may be a polymer containing UV blocking components. In one embodiment, the single layer may be a polysiloxane containing UV blocking components. In another embodiment, the single layer may be a polyurethane or other polymer containing benzophenone to other phenol containing compound that absorbs UV light. In another embodiment, the single layer may be a metal oxide. For example, the single layer may zinc oxide, titanium oxide, cerium oxide, or any mixture of these metal oxides. In yet another embodiment, the single layer may be a polymer material including metal oxide particles. In one example, the single layer may be a polymer containing nano-scale particles of zinc oxide.

In another alternative embodiment, a plurality of alternating layers of a soft coating material and a hard coating material are deposited between the UV blocking material and the hydrophobic material.

The substrate 120 may be a metal, a rigid polymer material such as an acrylic, polycarbonate or plastic, a fiber reinforced polymer matrix, an amorphous material such as glass, or other similar material. The substrate 120 may be a hard, soft, flexible or rigid material. The coating 210 benefits any substrate 120 where the coating 210 is harder than the substrate 220. In one embodiment, the substrate 120 may be a common aircraft passenger window formed of acrylic or other similar polymeric material. For example, the coating 210 may be applied to stretched acrylic substrate, such as a stretched acrylic aircraft window, to improve crack growth resistance. U.S. Patent Publication No. 2007/0122598A1, published May 31, 2007, and U.S. patent application Ser. No. 12/137,390, filed Jun. 11, 2008, disclose duplex coating schemes that include soft and hard coating layers, the disclosures both of which are incorporated by reference herein in their entireties.

The soft coating material has greater adhesion and flexibility characteristics relative to the hard coating material. The greater adhesion and flexibility of the soft coating material improves the adhesion of the coating 110 to the substrate 120. The soft coating material provides a bonding layer and thus is deposited prior to depositing hard coating material. The soft coating material need not be very thick to provide the adhesion benefit to the hard coating material. In one embodiment, the soft coating material may have a thickness of between about 3 µm and 7 µm. For example, the soft coating material may have a thickness of about 4 µm, 5 µm, or 6 µm. The thickness of the soft coating material is sufficient to ensure the adhesion of hard coating material to substrate 120.

In one embodiment, the soft coating material has a general composition of $SiO_xC_y$ having about 30% to about 35% Si, about 30% to about 35% C, and about 30% to about 35% O. In one embodiment, the soft material has a hardness of about 0.5 GPa to about 1.5 GPa. Within this application, all composition percents are provided as atomic percent.

As discussed above, the hard coating material has greater hardness, wear, and weatherability characteristics relative to the soft coating material. The greater hardness, wear, and weatherability characteristics improve the resistance of the coating 110 against mechanical scratching, chemical attack, and environmental degradation. In one embodiment, the hard coating material may have a thickness of between about 3 µm and 7 µm. For example, the hard coating material may have a thickness of about 4 µm, 5 µm, or 6 µm. The thickness of the hard coating material is sufficient to provide a desired durability to the coating 110. In one embodiment, the hard coating material has a general composition of $SiO_xC_y$ having about 30% to about 35% Si, about 25% to about 30% C, and about 40% to about 45% O. In one embodiment, the hard coating material has a hardness of about 1.9 GPa to about 6.0 GPa. In one embodiment, the layer thicknesses will be in the nanometer range so that nanostructure induced (for example Hall-Pitch effect) mechanical strength will be in effect.

As shown in FIG. 1, the thickness of each layer of the second layer 130 and third layer 140 are approximately equal. In yet another embodiment, the layers of the second layer 130 and/or the third layer 140 may vary in thickness. In still another embodiment, the coating 210 may include more than one soft coating material and more than one hard coating material. For example, different soft coatings materials and/or different hard coatings materials may be used that vary in composition and/or hardness.

The coating 110 improves resistance of the substrate 120 to surface effects. In one embodiment, the abrasion resistance of the coating 110, as measured by the percent change in haze as measured in a Taber wear Test (ASTM D-1044-90), is more than two orders of magnitude better than that for a polysiloxane coated polycarbonate substrate. In one embodiment, the erosion resistance of the coating 110, as measured by percent change in haze as measured in a Falling Sand Test (ASTM D 968-05), is more than a factor of three better than that for glass. In addition, the optical properties, including light transmittance in the visible region, clarity and haze, of a substrate 120 with a coating 110 disposed thereupon are approximately equal to the same properties of a substrate 120 with a single polysiloxane coating.

In an exemplary method of forming the coated substrate 100 according to the disclosure, a plasma based deposition technique can be used to deposit transparent silicon oxycarbide nano-layers and form the alternating soft and hard, flexible multi-layers. In this scheme, process parameters, for example, the oxygen to silicon precursor ratio, would determine coating characteristics such as hardness, modulus and coating deposition rate.

In one embodiment of the invention, the soft and hard materials are applied in a single step using a plasma based deposition process. By tuning the process parameter, the present scheme allows manipulation of individual layer characteristics such as layer thickness, hardness and modulus. The ability to change these coating characteristics would enable the applicability of the same system to process products for different applications such as windows for aircraft or cell phone screens where the requirements can be vastly different. For example, aircraft window coatings need to be hard and flexible whereas in such applications as consumer electronics the coatings should be resistant to wear and exposure to consumables such as coke. From a manufacturing point of view, both the coating application cost and product thru-put are increased.

In one embodiment, the soft and hard coating layers 140, 150 are formed by depositing alternating layers of soft coating material and hard coating material having differing $SiO_xC_y$ compositions. The coating 110 is further formed by depositing the UV blocking layer 130 and hydrophobic layer 160. The coating 110 may be formed by using a plasma based deposition process.

The coating 110, other than the hydrophobic layer 160, may be formed in a single step continuous process or may be formed by a multiple step discontinuous process. A substantially seamless material transition exits between the alternating layers of the soft coating material and the hard coating material, which results from the use of the plasma deposition process to deposit both layers. In one embodiment, the coating 110, except for the hydrophobic layer 160, is formed in a single coating process without removing the substrate 120 from the process chamber. In yet another embodiment, the substrate 120 is not removed from the process chamber and input parameters such as chemical gas flow rates, are varied during the coating process. By controlling and adjusting the deposition process parameters, individual layer characteristics including composition, layer thickness, hardness and modulus may be controlled and individually selected for each deposited layer. Furthermore, deposition parameters such as bias voltage, pressure, temperature and flow rate can be controlled and adjusted to influence the microstructure of the coating and its relative hardness or softness. Thus, two coatings with the same chemical composition may have different coating densities having different hardness and modulus characteristics.

The plasma based deposition process of the current invention uses a plasma-enhanced chemical vapor deposition (PECVD) that uses the energy of plasma electrons to disassociate process gases. The plasma source includes a radio frequency or microwave power source and an appropriate applicator. For example, a plasma reactor using microwave power at 2.45 GHz may be used to dissociate and ionize the process gasses. The layers can be deposited at low substrate temperatures of between about 20° C. to about 30° C. The PECVD conditions, such as gas flow, deposition pressure, and plasma power may be adjusted to produce a hard, transparent coating in accordance with known plasma deposition principles.

The process further employs the principal of Electron Cyclotron Resonance (ECR), in which a static magnetic field is applied along the direction of microwave propagation. Resonance occurs when the microwave radian frequency co is equal to the cyclotron frequency $\omega_e = qB/m_e$, where q is the electronic charge, B is the magnetic field strength, and $m_e$ is the electron mass. If f=2.45 GHz, the resonance field value is 875 Gauss. At resonance, the electrons gyrate in synchronism with the oscillating microwave field. The plasma electrons are thus accelerated by the microwave field.

The process gas used in this deposition process is oxygen used in combination with an organosilicon precursor. For example, the precursor gas may be any one of octamethycyclotetrasiloxane ($C_8H_{24}O_4Si_4$)), also know as OMCTS, hexamethyldisiloxane ($Si_2C_6H_{18}O$), tetramethylcyclotetrasiloxane (Si4C4H16O4), and octamethylcyclotetrasiloxane (($SiO)_4(CH_3)_8$). In one embodiment, OMCTS is used as the precursor gas. The OMCTS vapor pressure at room temperature is approximately one Torr, which greatly facilitates vapor introduction into the process chamber. Additionally, the Hazardous Materials Identification System (HMIS®) hazard rating for OMCTS is 1-2-0, which means that OMCTS is about as safe as a typical house paint. In another embodiment, combinations of different precursor gases may be used.

To deposit the alternating layers of $SiO_xC_y$, the OMCTS is heated to about 70° C. to increase vapor pressure of the OMCTS. The vapor is then metered into the process chamber by a heated mass flow controller. The vapor is introduced just above the substrate through four ports equally spaced around the chamber, while oxygen $O_2$ is injected through four ports located under the input microwave window. The ratio of OMCTS to $O_2$ (OMCTS/$O_2$) is between about 40-60 to form a soft layer and is between about 15-35 to form a hard layer. In one embodiment, the substrate is neither heated or cooled by external systems and/or methods, and is at ambient temperature at the start of the deposition process. The substrate temperature may increase as a result of the coating deposition. In another embodiment, the substrate temperature is less than about 100° C. during the deposition.

There are two methods that can be used to deposit the UV blocking layer 130. If using a solvent based coating, spry, dip or float coating techniques are used. These coatings include metal oxide particles, such as zinc oxide particles, or contain an organic UV blocking material such as a compound having a phenol group. UV blocking coatings can also be deposited using PECVD in a process similar to the hard coat deposition. For example, zinc oxide coating can be deposited using a diethylzinc and oxygen in a PECVD process.

The outer protective layer 160 may be applied by a spray or dip process. In one example, a thin layer of the coating solution is brushed on the substrate. The substrate is allowed to dry and any resulting haze is gently buffed out with a microfiber towel.

In one embodiment, substrate 120, prior to being loaded into a plasma deposition chamber for the application of the coating 110, may be first chemically cleaned to remove contaminants such as hydrocarbons and other undesirable materials. The cleaning process may be accomplished using, for example, ultrasonic cleaning in solvents or aqueous detergents. Once the desired vacuum conditions are obtained, substrate 120 may be sputter cleaned using inert ions and/or oxygen ions. Once the cleaning step is complete, the hard coating application can commence.

Figure 2:
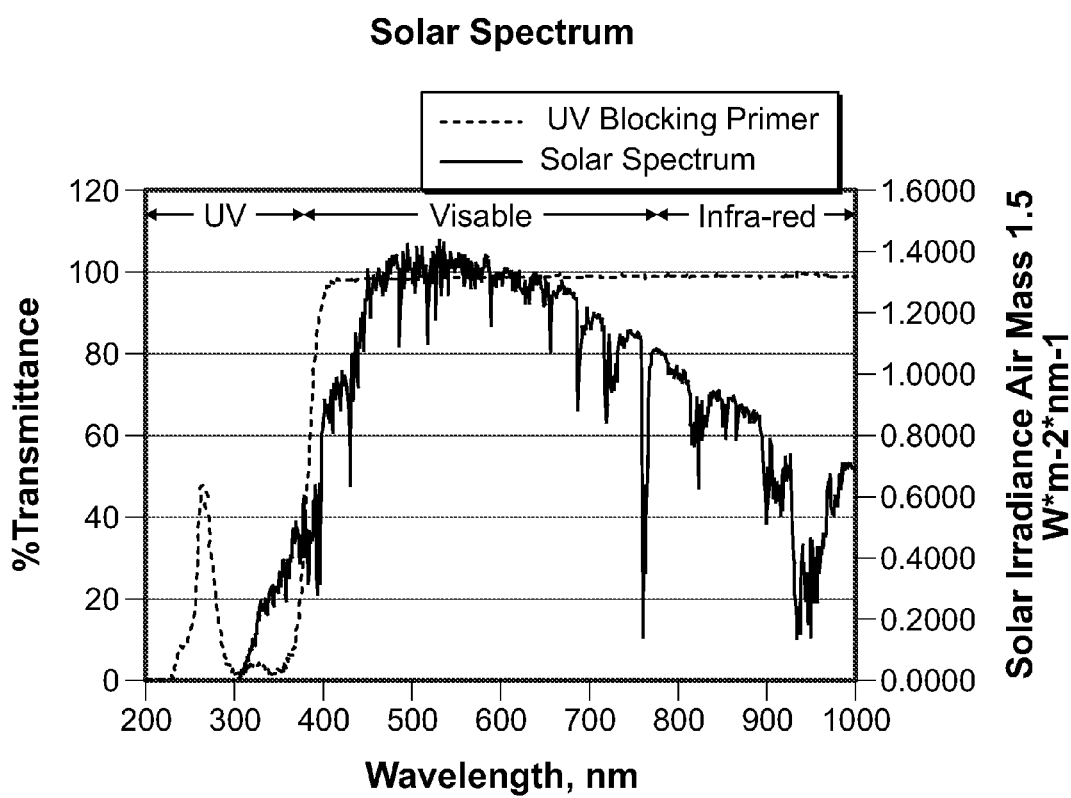
FIG. 2 is a graph showing the amount of light transmitted through an exemplary UV blocking coating compared with the Air Mass 1.5 solar spectrum.

FIG. 2 shows the test results for a 0.125 inch thick quartz glass sample having a coating prepared in accordance with the present disclosure. Quartz is transparent in the UV region and thus the effect of UV blocking characteristics of the coating can be clearly exemplified. The spectrum of light transmitted through the UV blocking layer was obtained with a UV-Vis spectrometer. The transmitted light, or in other words, the light that passed through the UV blocking layer, was compared with the spectrum of solar light on the Earth's surface, as provided by Air Mass 1.5 common standard. As can be seen in FIG. 2, nearly all of the UV light, as defined as wavelengths of less than 390 nm, was blocked by the UV blocking layer. The peak in transmittance at 270 nm is not of concern because there is not any irradiance in Air Mass 1.5 at that wavelength.

In another test, 0.125 inch thick transparent composite samples having a coating prepared in accordance with the present disclosure were prepared. These samples and an uncoated sample were exposed to 300 kJ of UV light in an Atlas Ci4000 WeatherOmeter according to SAE J 1960. The WeatherOmeter exposes samples to UV light at a controlled temperature and humidity to simulate typical conditions. In this text, a visual inspection of the coated samples did not reveal any change in color to the coated samples, while the uncoated samples were yellow and had high haze.

Figure 3:
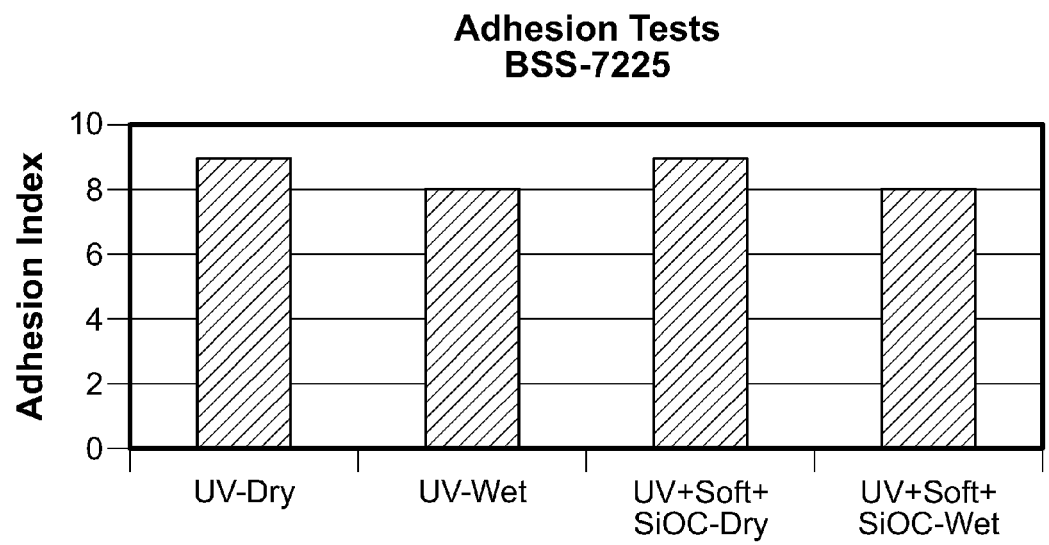
FIG. 3 is a graph showing the results of a test determining the relative adhesion of the UV blocking coating and UV dual layer coating according to BSS 7225 Type I and III for a dry and 24 hour water soak.

FIG. 3 shows test results for another set of samples prepared according to the present disclosure. In this test, the adhesion of the coating to 0.125 inch transparent composite substrates was tested by forming a cross hatch scribe of 5 parallel lines set 45 deg off upon the samples and applying a tape over the scribed area. Additional samples were prepared in accordance with the present disclosure. Two sets of samples were prepared for each coating. One set was scribed and immediately tested. The second set was soaked in water for 24 hours. The samples were dried off, scribed and tested. Adhesion was analyzed for dry samples and after a 24 hour soak (Type I and Type III). As can be seen in FIG. 3, the coating according to the present disclosure had excellent adhesion for both wet and dry tests. All coatings with an adhesion of 8 or higher were considered to be passing according to the criteria of this exemplary test.

Figure 4:
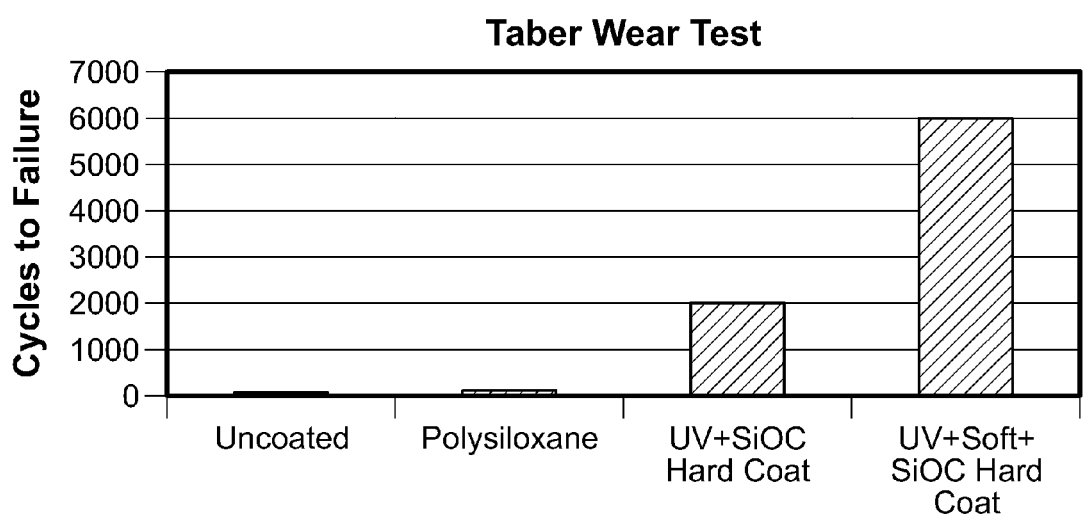
FIG. 4 is a graph showing the results of a test determining the abrasion resistance of the UV coating comparing optical haze as a function of Taber wear cycle (ASTM D-1044) for another exemplary coating according to the disclosure.

FIG. 4 shows the test results for yet another test of samples prepared according to the present disclosure. In this test, coated 0.125 inch thick transparent composite samples were tested for wear in accordance with the procedure described in ASTM D-1044-90, "Standard Test Method for Resistance of Transparent Plastics to Surface Abrasion", also known as a Taber Wear Test. The test included tow CS-10 wheels to which a predetermined weight of 500 gm load was applied. The wheels abraded the coated substrate surface as the substrate was rotated on a table. Increase in haze is used as the criteria for measuring the severity of abrasion. In this test, the samples were exposed until the haze increased by 5% as a result of abrasion. As can be seen in FIG. 4, the bare substrates exhibited very poor wear resistance, while substrates coated in accordance with the present disclosure showed improved resistance to abrasion as compared to uncoated substrates, polysiloxane coated substrates, and UV blocking layer and polysiloxane coated substrates.

This disclosure describes an extremely durable transparent coating that provides UV protection to an underlying substrate. In one embodiment, the coating may be constantly monitored. Though this invention is aimed at transparent substrates, such as windows, any critical application where a hard, transparent protective coating that provides UV protection is desired or required to protect a substrate is feasible.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. It is therefore intended that the following appended claims and claims hereafter introduced are interpreted to include all such modifications, permutations, additions, and sub-combinations as are within their true spirit and scope.

The invention claimed is:

1. A coating, comprising:
   a UV blocking layer; and
   a hard coating layer disposed above the UV blocking layer;
   wherein the hard coating layer has the general formula $SiO_xC_y$,
   wherein the UV blocking layer comprises a first layer having the general formula $SiO_xC_y$, and a second layer, wherein the first layer provides UV blocking and the second layer provides a soft coating layer between the first layer and the hard coating layer.

2. The coating of claim 1, wherein the UV blocking layer is a polysiloxane coating that blocks greater than about 97% of UV radiation up to 375 nm.

3. The coating of claim 1, wherein the UV blocking layer comprises a metal oxide.

4. The coating of claim 1, wherein the hard coating comprises about 30% to about 35% Si, about 25% to about 30% C, and about 40% to about 45% O.

5. The coating of claim 1, further comprising a hydrophobic outer layer deposited upon the hard coating layer.

6. The coating of claim 1, wherein the soft coating comprises about 30% to about 35% Si, about 30% to about 35% C, and about 30% to about 35% O.

7. The coating of claim 1, wherein the UV blocking layer is a metal oxide layer.

8. A article comprising:
   a substrate; and
   a coating deposited upon the substrate,
   wherein the coating comprises:
   a UV blocking layer disposed upon the substrate; and
   a hard coating layer; and
   wherein the hard coating layer has the general formula $SiO_xC_y$,
   wherein the UV blocking comprises a first layer having the general formula $SiO_xC_y$, and a second layer, wherein the first layer provides UV blocking and the second layer provides a soft coating layer between the first layer and the hard coating layer.

9. The article of claim 8, wherein the UV blocking layer comprises a metal oxide.

10. A method of forming a coating on a substrate, comprising:
    depositing UV blocking layer upon a substrate, wherein the UV blocking layer is deposited as a first layer having the general formula $SiO_xC_y$, and a second layer, wherein the second layer is a soft coating layer; and
    depositing a hard coating layer upon the UV blocking layer;
    wherein the hard coating has the general formula $SiO_xC_y$.

11. The method of claim 10, wherein the soft coating layer and the hard coating layer are deposited by a plasma deposition process.

12. The method of claim 11, wherein the plasma deposition process is continuous.

13. The method of claim 11, wherein the plasma deposition process is discontinuous.

14. The method of claim 11, wherein more than one alternating layers of a soft coating layer and a hard coating layer are deposited.

\* \* \* \* \*